United States Patent [19]

Hiraoka

[11] Patent Number: 5,466,764
[45] Date of Patent: Nov. 14, 1995

[54] ADHESIVE COMPOSITION COMPRISING A CYANOACRYLATE AND AN EPOXY ADDUCT

[75] Inventor: Soichiro Hiraoka, Otsuki, Japan

[73] Assignee: Three Bond Co., Ltd., Japan

[21] Appl. No.: 307,368

[22] Filed: Sep. 16, 1994

[30] Foreign Application Priority Data

Sep. 17, 1993 [JP] Japan .................................. 5-253611

[51] Int. Cl.[6] .................................................. C08F 283/00
[52] U.S. Cl. .......................... 525/530; 525/531; 525/532; 525/533; 528/87; 528/112; 528/297; 528/401; 558/443; 549/515; 549/521; 560/227; 560/230
[58] Field of Search .............................. 525/530, 531, 525/532, 533; 528/87, 112, 297, 401; 558/443; 549/515, 521; 560/227, 230

[56] References Cited

U.S. PATENT DOCUMENTS

| 3,839,373 | 10/1974 | Jaeger ........................ 560/227 |
| 3,860,613 | 1/1975 | Jaeger ........................ 560/227 |
| 4,444,933 | 4/1984 | Columbus et al. ............. 524/297 |
| 4,950,701 | 8/1990 | Okamura et al. ............... 528/21 |
| 5,290,825 | 3/1994 | Lazar ........................ 524/403 |
| 5,312,864 | 5/1994 | Wenz et al. .................. 524/716 |

FOREIGN PATENT DOCUMENTS

| 52-77145 | 6/1977 | Japan . |
| 52-90536 | 7/1977 | Japan . |
| 52-80336 | 7/1977 | Japan . |
| 52-78933 | 7/1977 | Japan . |
| 52-111936 | 9/1977 | Japan . |
| 55-66980 | 5/1980 | Japan . |
| 55-99980 | 7/1980 | Japan . |
| 55-142068 | 11/1980 | Japan . |
| 56-5807 | 1/1981 | Japan . |
| 59-500132 | 1/1984 | Japan . |
| 59-147067 | 8/1984 | Japan . |

*Primary Examiner*—Melvyn I. Marquis
*Assistant Examiner*—Randy Gulakowski
*Attorney, Agent, or Firm*—Ostrolenk, Faber, Gerb & Soffen

[57] ABSTRACT

There are here disclosed an adhesive composition obtained by adding a fluorine-containing carboxylic acid epoxy adduct to a 2-cyanoacrylate, and a process for preparing the adhesive composition. This 2-cyanoacrylate-based adhesive composition is excellent in storage stability and particularly excellent in adhesive force and impact resistance and has a high hardening rate. In particular, the adhesive strength of the 2-cyanoacrylate-based adhesive composition can be remarkably increased without lowering the hardening rate, and so the 2-cyanoacrylate-based adhesive composition can exert a sufficient resistance to impact and the like at the time of the adhesion of metals, rubbers, plastics and lumbers and the reliability of adherends can be improved.

10 Claims, No Drawings

ADHESIVE COMPOSITION COMPRISING A CYANOACRYLATE AND AN EPOXY ADDUCT

BACKGROUND OF THE INVENTION

1. Field of the Invention

The present invention relates to a 2-cyanoacrylate-based adhesive composition which is excellent in storage stability and particularly excellent in adhesive force and impact resistance and which has a high hardening rate, and it also relates to a process for preparing the 2-cyanoacrylate-based adhesive composition.

2. Description of the Prior Art

A 2-cyanoacrylate has been used as an adhesive which can instantaneously harden with the aid of a trace amount of moisture on the surfaces of adherends, and it is suitable for the adhesion of rubbers, plastics, lumbers and the like.

However, the 2-cyanoacrylate-based adhesive is usually poor in impact resistance, and so it cannot be used in a site where impact strength is required. Hence, this kind of adhesive has often restrictively been used for temporary fixing.

In order to overcome these drawbacks, there have been investigated a method which comprises introducing a long-chain alkyl group into an ester moiety of the 2-cyanoacrylate, a method which comprises adding an acrylic rubber or acrylonitrile-butadiene rubber to the 2-cyanoacrylate, and a method which comprises adding a plasticizer such as dioctyl phthalate to the 2-cyanoacrylate to impart flexibility thereto and to thereby improve durability to impact.

Furthermore, another method has also been employed which comprises adding a compound such as acetic acid, butyric acid or trifluoroacetic acid to the 2-cyanoacrylate to remarkably improve adhesive strength and to thereby improve impact resistance.

In the above-mentioned method which comprises introducing the long-chain alkyl group into the ester moiety to obtain the flexible 2-cyanoacrylate, it is necessary that the distillation temperature be raised, which makes the manufacture of the adhesive difficult. In addition, anionic polymerization is slow owing to moisture, and so a role as the instantaneous adhesive cannot be played inconveniently.

Moreover, the above-mentioned method which comprises adding the acrylic rubber or acrylonitrile-butadiene rubber to the 2-cyanoacrylate is known to be very effective means as a technique for improving impact resistance, humidity resistance, heat resistance, cold resistance and the like of the 2-cyanoacrylate-based adhesive (Japanese Patent Application Laid-open No. 500132/1984). However, also in this case, the storage stability of the mixed 2-cyanoacrylate-based adhesive is poor, and so when it is sold, a strict lot control is necessary.

With regard to the above-mentioned method which comprises adding a plasticizer such as dioctyl phthalate, the effect of imparting some flexibility to the 2-cyanoacrylate-based adhesive has been confirmed, but this method has drawbacks such as the deterioration of adhesive strength and the decline of adhesive force with time owing to the migration of the plasticizer.

As disclosed in Japanese Patent Application Laid-open Nos. 111936/1977, 77145/1977, 78933/1977, 80336/1977, 90536/1977, 66980/1980, 99980/1980, 142068/1980, 5807/1981 and 147067/1984, methods which comprise adding an acidic compound have the effect of remarkably improving adhesive force, and as a technique for enhancing the durability of the 2-cyanoacrylate-based adhesive, these methods are extremely useful means.

In this case, however, since the compound to be added is acidic, the hardening rate of the 2-cyanoacrylate-based adhesive noticeably declines if an excess amount of the acidic compound is added. In consequence, a function as the 2-cyanoacrylate-based instantaneous adhesive outstandingly deteriorates. Conversely, if the amount of the acidic compound is such as not to have a bad influence on the hardening rate, the sufficient improvement effect of the adhesive force cannot be obtained.

Thus, it has been desired for a long time to develop a 2-cyanoacrylate-based adhesive composition which can remarkably improve adhesive force and can improve impact resistance and durability without introducing a specific ester group, without adding a rubber, an elastomer or a plasticizer, and without lowering the hardening rate of the adhesive.

SUMMARY OF THE INVENTION

The present inventors has intensively researched with the intention of developing a 2-cyanoacrylate-based adhesive composition having the above-mentioned performance, and as a result, the present invention has now been completed.

An object of the present invention is to provide an adhesive composition obtained by adding a fluorine-containing carboxylic acid epoxy adduct to a 2-cyanoacrylate.

Another object of the present invention is to provide a process for preparing an adhesive composition which comprises the step of adding a fluorine-containing carboxylic acid epoxy adduct to a 2-cyanoacrylate.

That is to say, according to the present invention, characteristics such as quick hardening, the remarkable improvement of adhesive strength, the increase of the reliability of the adhesive such as impact resistance can be imparted to the 2-cyanoacrylate by adding a fluorine-containing carboxylic acid epoxy adduct to the 2-cyanoacrylate without introducing a specific ester group, without adding a rubber, an elastomer or a plasticizer, and without lowering the hardening rate of the adhesive, though its mechanism is not definite.

DETAILED DESCRIPTION OF THE INVENTION

A 2-cyanoacrylate which can be used in the present invention includes all of usually usable esters, and typical examples of the 2-cyanoacrylate include 2-cyanoacrylates of methyl, ethyl, n-propyl, iso-propyl, n-butyl, iso-butyl, sec-butyl, tert-butyl, amyl, n-hexyl, cyclohexyl, heptyl, n-octyl, 2-ethylhexyl, dodecyl, allyl, propargyl, benzyl, phenyl, methoxyethyl, ethoxyethyl, 2-chloroethyl, hexafluoroisopropyl, trifluoroethyl and 2-cyanoethyl.

A fluorine-containing carboxylic acid epoxy adduct which is used in the present invention has at least one of groups represented by the formulae

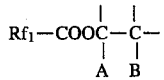

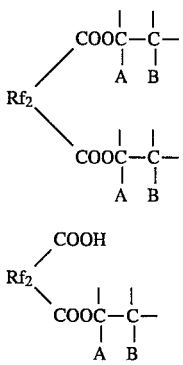

wherein A is a hydrogen atom and B is a hydroxyl group, or A is the hydroxyl group and B is the hydrogen atom; $Rf_1$ is a perfluoroalkyl group in which an alkyl group has 1 to 12 carbon atoms, or a pentafluorophenyl group; and $Rf_2$ is a perfluoroalkylene group in which an alkylene group has 2 to 12 carbon atoms, or a tetrafluorophenylene group.

The fluorine-containing carboxylic acid epoxy adduct which can be used in the present invention can be obtained by addition reaction of a fluorine-containing carboxylic acid and an epoxy resin.

Typical examples of the usable epoxy resin include n-butyl glycidyl ether, allyl glycidyl ether, 2-ethylhexyl glycidyl ether, styrene oxide, phenyl glycidyl ether, cresyl glycidyl ether, p-sec-butylphenyl glycidyl ether, glycidyl methacrylate, tert-carboxylic acid glycidyl ester (Cardura E), diglycidyl ether, (poly)ethylene glycol diglycidyl ether, (poly)propylene glycol diglycidyl ether, butanediol diglycidyl ether, trimethylolpropane triglycidyl ether, glycerin triglycidyl ether, Kadanol epoxide, bisphenol A diglycidyl ether, bisphenol F diglycidyl ether, bisphenol S diglycidyl ether, resorcinol diglycidyl ether, hexahydrobisphenol A diglycidyl ether, neopentyl glycol diglycidyl ether, phthalic acid diglycidyl ether, dimer acid diglycidyl ester, cresolnovolak polyglycidyl ether, phenolnovolak polyglycidyl ether, tetrabromobisphenol A diglycidyl ether, bisphenol hexafluoroacetone diglycidyl ether, polybutadiene epoxide, epoxidated soybean oil, 3,4-epoxy- 6-methylcyclohexamethyl carboxylate, 3,4-epoxycyclohexylmethyl carboxylate, tetraphenyl glycidyl ether ethane and triphenyl glycidyl ether methane.

Among these compounds, examples of the epoxy resin suitable to obtain the fluorine-containing carboxylic acid epoxy adduct which can be used in the present invention include polyethylene glycol diglycidyl ether, polypropylene glycol diglycidyl ether, n-butyl glycidyl ether, allyl glycidyl ether, 2-ethylhexyl glycidyl ether, phenyl glycidyl ether, glycidyl methacrylate, diglycidyl ether, bisphenol A diglycidyl ether, bisphenol F diglycidyl ether, hexahydrobisphenol A diglycidyl ether, 3,4-epoxy-6-methylcyclohexamethyl carboxylate and 3,4-epoxycyclohexylmethyl carboxylate which have a low viscosity at ordinary temperature.

Some kinds of epoxy resins are solid at ordinary temperature, or other kinds of epoxy resins become solid or vigorously generate heat of reaction when reacted with a fluorine-containing carboxylic acid such as trifluoroacetic acid. However, when each of these solid epoxy resins is reacted in a solvent such as toluene or diluted with a plasticizer such as dioctyl phthalate, dibutyl phthalate or a phosphate, or an organic solvent such as toluene, xylene, acetone or MIBK, the liquid fluorine-containing carboxylic acid epoxy adduct can be obtained.

On the other hand, a fluorine-containing carboxylic acid is usually available as a reagent, and compounds represented by the following formulae can be used:

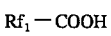

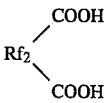

wherein $Rf_1$ is a perfluoroalkyl group in which an alkyl group has 1 to 12 carbon atoms, or a pentafluorophenyl group; and $Rf_2$ is a perfluoroalkylene group in which an alkylene group has 2 to 12 carbon atoms, or a tetrafluorophenylene group.

Typical examples of the fluorine-containing carboxylic acid include trifluoroacetic acid, pentafluoropropyonic acid, perfluorobutyric acid, perfluorooctanoic acid, perfluorododecanoic acid, perfluorolauric acid, pentafluorobenzonic acid, perfluorosuccinic acid, difluorosuccinic acid, perfluoroglutaric acid, perfluoroadipic acid and tetrafluorophthalic acid.

The fluorine-containing carboxylic acid epoxy adduct which can be used in the present invention can be easily obtained by mixing the above-mentioned fluorine-containing carboxylic acid with the epoxy resin, and then heating the mixture from ordinary temperature to 150° C. to carry out addition reaction between a carboxyl group of the fluorine-containing carboxylic acid and a glycidyl group of the epoxy resin. For example, the addition reaction of trifluoroacetic acid and the glycidyl group proceeds rapidly at ordinary temperature.

The thus obtained fluorine-containing carboxylic acid epoxy adduct has characteristics capable of improving the adhesive force of the 2-cyanoacrylate-based adhesive without impairing a hardening rate and the like.

In order to realize these characteristics, the amount of the fluorine-containing carboxylic acid epoxy adduct is preferably in the range of 0.001 to 10 parts by weight, more preferably 0.001 to 5 parts by weight based on 100 parts by weight of the 2-cyanoacrylate. If the amount of the fluorine-containing carboxylic acid epoxy adduct is more than 10 parts by weight, it is difficult to secure stability as a one-pack type adhesive.

In general, a stabilizer, a thickener, a plasticizer, a crosslinking agent, a hardening accelerator or the like are added to the 2-cyanoacrylate adhesive, and also in the present invention, these additives may be added thereto. Examples of the stabilizer include $SO_2$, a sulfonic acid, sultone, lactone, boron fluoride, hydroquinone monomethyl ether, catechol and pyrogallol, and the amount of this stabilizer is in the range of 1 to 1,000 ppm.

In the case that the adhesive having a high viscosity is required, several percent of poly(methyl methacrylate), poly(2-cyanoacrylate), acrylic rubber, acrylonitrile-butadiene rubber or polyurethane elastomer can be added to the adhesive, thereby obtaining a desired viscosity.

Furthermore, by adding fumed silica to the adhesive, thixoptropic properties can be imparted thereto, so that the adhesive does not flow on a vertical surface and the improvement of workability can be attained.

In the case that a high hardening rate is further required, polyethylene glycol, crown ether or a calixarene compound can be further added.

The adhesive composition obtained by the present invention is suitable for the adhesion of metals such as iron, stainless steel, copper, brass, aluminum, zinc, tin and ferrite, plastics such as polycarbonates, polystyrene and Bakelites, and rubbers such as NBR, SBR, CR, NR and EPDM. When these materials are bonded to each other, the adhesive hardens rapidly without lowering the adhesive rate, and the adhesive strength of the 2-cyanoacrylate-based adhesive can be remarkably improved, and the reliability of the adhesive such as impact resistance can be improved.

According to the present invention, there can be obtained a 2-cyanoacrylate-based adhesive composition which is excellent in storage stability and particularly excellent in adhesive force and impact resistance and which has a high hardening rate.

In particular, the adhesive strength of the 2-cyanoacrylate-based adhesive can be remarkably increased without lowering the hardening rate, and so the 2-cyanoacrylate-based adhesive can exert a sufficient resistance to impact and the like at the time of the adhesion of metals, rubbers, plastics and lumbers and the reliability of adherends can be improved. Thus, the 2-cyanoacrylate-based adhesive composition of the present invention can be utilized as the adhesive in many industrial fields of electricity, machine, electron, transport and the like, and as a domestic adhesive. Therefore, the utility value of the present invention is extremely high.

Now, the present invention will be described in more detail with reference to examples and comparative examples. It should be noted that the scope of the present invention is not limited to these examples.

EXAMPLE 1

To toluene were added with stirring little by little 20.0 g of trifluoroacetic acid and 40.0 g of polypropylene glycol diglycidyl ether (P-400), and the resultant solution was then heated for 2 hours under toluene reflux, to obtain a reaction product solution. Next, vacuum deaeration was carried out by a vacuum pump to obtain a desired fluorine-containing carboxylic acid epoxy adduct (I).

A suitable amount of this compound was added with stirring to a commercially available 2-cyanoacrylate-based adhesive (trade name Three Bond 1741) containing 0.1% of hydroquinone and a trace amount of boron trifluoride based on the weight of the 2-cyanoacrylate, and it was then dissolved at ordinary temperature to prepare products (1) and (2) of Example 1.

EXAMPLE 2

In the same manner as in Example 1, 11.4 g of trifluoroacetic acid was reacted with 13.0 g of butyl glycidyl ether (BG), and after vacuum deaeration, a fluorine-containing carboxylic acid epoxy adduct (II) was obtained. Next, the same procedure as in Example 1 was effected to prepare products (1) and (2) of Example 2.

COMPARATIVE EXAMPLE 1

A suitable amount of trifluoroacetic acid was added to Three Bond 1741, followed by stirring and dissolving at ordinary temperature, to prepare products (1) to (3) of Comparative Example 1.

COMPARATIVE EXAMPLE 2

A suitable amount of acetic acid was added to Three Bond 1741, followed by stirring, to prepare products (1) and (2) of Comparative Example 2.

COMPARATIVE EXAMPLE 3

Suitable amounts of an epoxy resin p-400 and butyl glycidyl ether were added to Three Bond 1741, followed by stirring, to prepare products (1) and (2) of Comparative Example 3.

For the products of the above-mentioned examples and comparative examples, the following items were measured to confirm the usefulness of the present invention:

(1) An initial hardening time (between steel plates).
(2) Adhesive strength between the steel plates.
(3) Impact resistance (JIS-K-6855).
(4) Storage stability at 70° C. (days until the occurrence of gelation or noticeable viscosity increase). The results of these tests are shown in Tables 1, 2 and 3.

TABLE 1

|  | Example 1 | | Example 2 | |
| --- | --- | --- | --- | --- |
|  | (1) | (2) | (1) | (2) |
| Three Bond 1741 (g) Flourine-containing carboxylic acid epoxy adduct | 100 | 100 | 100 | 100 |
| TFAc/P-400 adduct (g) | 0.05 | 0.2 |  |  |
| TFAc/BG adduct (g) |  |  | 0.1 | 0.6 |
| Initial hardening time (Steel) (sec) | 5 | 10 | 10 | 10 |
| Adhesive strength (Steels) (Kgf/cm²) | 180 | 240 | 195 | 235 |
| Impact resistance (Kgfcm/cm²) | 25.0 | 40.6 | 28.0 | 37.5 |
| Storage stability at 70° C. (days) | >7 | >7 | >7 | >7 |

TFAc: Trifluoroacetic acid
BG: Butyl glycidyl ether
P-400: Polypropylene glycol diglycidyl ether

TABLE 2

|  | Comp. Ex. 1 | | | Comp. Ex. 2 | |
| --- | --- | --- | --- | --- | --- |
|  | (1) | (2) | (3) | (1) | (2) |
| Three Bond 1741 (g) | 100 | 100 | 100 | 100 | 100 |
| Trifluoroacetic acid (g) | — | 0.2 | 0.5 |  |  |
| Acetic acid (g) |  |  |  | 0.2 | 0.5 |
| Initial hardening time (Steel) (sec) | 5 | 150 | >300 | 10 | 60 |
| Adhesive strength (Steels) (Kgf/cm²) | 132 | 173 | 182 | 136 | 156 |
| Impact resistance (Kgfcm/cm²) | 9.0 | 17.1 | 18.5 | 8.9 | 10.5 |
| Storage stability at 70° C. (days) | >7 | >7 | >7 | >7 | >7 |

TABLE 3

|  | Comp. Ex. 3 | |
| --- | --- | --- |
|  | (1) | (2) |
| Three Bond 1741 (g) | 100 | 100 |
| P-400 (g) | 0.5 |  |
| Butyl glycidyl ether (g) |  | 0.3 |
| Initial hardening time (Steel) (sec) | 5 | 10 |
| Adhesive strength (Steels) (Kgf/cm²) | 109 | 125 |
| Impact resistance (Kgfcm/cm²) | 9.5 | 8.3 |
| Storage stability at 70° C. (days) | <1 | <1 |

What is claimed is:

1. An adhesive composition comprising a 2-cyanoacrylate and 0.001 to 10 parts by weight based on 100 parts by weight of the 2-cyanoacrylate of a fluorine-containing carboxylic acid epoxy adduct having at least one of groups represented by the formulae formulae

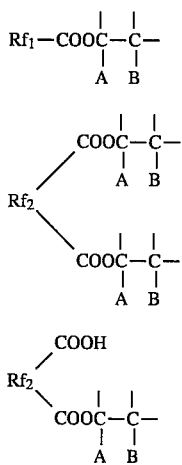

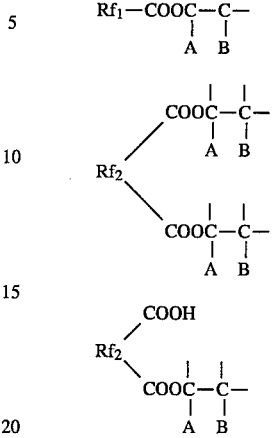

wherein A is a hydrogen atom and B is a hydroxy group, or A is the hydroxyl group and B is the hydrogen atom; $Rf_1$ is a perfluoroalkyl group in which an alkyl group has 1 to 12 carbon atoms or a pentafluorophenyl group; and $Rf_2$ is a perfluoroalkylene group in which an alkylene group has 2 to 12 carbon atoms or a tetrafluorophenylene group.

2. The adhesive composition according to claim 1 wherein the amounts of said fluorine-containing carboxylic acid epoxy adduct is up to 5 parts by weight based on 100 parts weight of the 2-cyanoacrylate.

3. The adhesive composition according to claim 2 wherein said fluorine-containing carboxylic acid epoxy adduct is the reaction product of an epoxy resin and a fluorine-containing carboxylic acid of the formulae $Rf_1$—$CO_2H$ and $Rf_2(CO_2H)_2$.

4. The adhesive composition according to claim 3 wherein the epoxy resin is polypropylene glycol glycidyl ether or butyl glycidyl ether and the fluorine-containing carboxylic acid is trifluoroacetic acid.

5. The adhesive composition according to claim 1 wherein the epoxy resin is polypropylene glycol glycidyl ether or butyl glycidyl ether and the fluorine-containing carboxylic acid is trifluoroacetic acid.

6. A process for preparing an adhesive composition which comprises the step of adding 0.001 to 10 parts by weight based on 100 parts by weight of a 2-cyanoacrylate of a fluorine-containing carboxylic acid epoxy adduct to a 2-cyanoacrylate wherein said fluorine-containing carboxylic acid epoxy adduct has at least one of groups represented by the formulae wherein A is a hydrogen atom and B is a hydroxyl group, or A is the hydroxyl group and B is the hydrogen atom; $Rf_1$ is a perfluoroalkl group in which an alkyl group has 1 to 12 carbon atoms or a pentafluorophenyl group; and $Rf_2$ is a perfluoroalkylene group in which an alkylene group has 2 to 12 carbon atoms or a tetrafluorophenylene group.

7. The process for preparing an adhesive composition according to claim 6 wherein the amount of said fluorine-containing carboxylic acid epoxy adduct is up to 5 parts by weight based on 100 parts by weight of the 2-cyanoacrylate.

8. The process for preparing an adhesive composition according to claim 7 wherein said fluorine-containing carboxylic acid epoxy adduct is the reaction product of an epoxy resin and a fluorine-containing carboxylic acid of the formulae $Rf_1$—$CO_2H$ and $Rf_2(CO_2H)_2$.

9. The process for preparing an adhesive composition according to claim 8 wherein the epoxy resin is polypropylene glycol glycidyl ether or butyl glycidyl ether and the fluorine-containing carboxylic acid is trifluoroacetic acid.

10. The process for preparing an adhesive composition according to claim 6 wherein the epoxy resin is polypropylene glycol glycidyl ether or butyl glycidyl ether and the fluorine-containing carboxylic acid is trifluoroacetic acid.

* * * * *